United States Patent
Garcia Azorero et al.

(10) Patent No.: US 10,673,817 B2
(45) Date of Patent: Jun. 2, 2020

(54) DYNAMIC POLICY RULE SELECTION

(71) Applicant: Telefonaktiebolaget LM Ericsson (publ), Stockholm (SE)

(72) Inventors: Fuencisla Garcia Azorero, Madrid (ES); Victor Ferraro Esparza, Valencia (ES); Ignacio Rivas Molina, Madrid (ES); Filipe Alexandre Rodrigues de Moura Leitao, Heidelberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 198 days.

(21) Appl. No.: 15/545,080

(22) PCT Filed: Jan. 26, 2015

(86) PCT No.: PCT/EP2015/051509
§ 371 (c)(1),
(2) Date: Jul. 20, 2017

(87) PCT Pub. No.: WO2016/119818
PCT Pub. Date: Aug. 4, 2016

(65) Prior Publication Data
US 2018/0007009 A1 Jan. 4, 2018

(51) Int. Cl.
*G06F 21/00* (2013.01)
*H04L 29/06* (2006.01)
*H04L 12/24* (2006.01)
*H04L 12/813* (2013.01)
*H04L 29/08* (2006.01)

(52) U.S. Cl.
CPC ...... *H04L 63/0263* (2013.01); *H04L 41/0893* (2013.01); *H04L 41/5006* (2013.01);
(Continued)

(58) Field of Classification Search
CPC . H04L 12/14; H04L 12/1407; H04L 12/1403; H04L 65/80; H04L 12/1457
See application file for complete search history.

(56) References Cited

U.S. PATENT DOCUMENTS

| 2011/0158090 | A1 | 6/2011 | Riley et al. |
| 2012/0059944 | A1* | 3/2012 | Fernandez Alonso ............ H04L 12/14 709/228 |
| 2012/0064878 | A1* | 3/2012 | Castro Castro ......... H04L 12/14 455/418 |
| 2014/0123292 | A1 | 5/2014 | Schmidt et al. |

OTHER PUBLICATIONS

3GPP TS 29.214 v12.6.0; Technical Specification; 3rd Generation Partnership Project; Technical Specification Group Core Network and Terminals; Policy and Charging Control over Rx reference point (Release 12)—Dec. 2014.
(Continued)

*Primary Examiner* — Ghazal B Shehni
(74) *Attorney, Agent, or Firm* — Baker Botts, LLP (57) ABSTRACT

The invention relates to a method, by a policy controller 100, for generating policy rules for data packet flows in a communications network. The policy controller 100 has access to a policy database 130 and stores a service level agreement. The service level agreement contains a plurality of different service level identifiers, each service level identifier being associated with a set of conditions that govern the policy rules to be applied to the data packet flows in the communications network. The method comprises the following steps: An authorization request is received for a data packet flow, the authorization request comprising service information for a service and a service level identifier. The policy database 130 is accessed and the set of conditions associated with the received service level identifier is determined. Further, based on the determined set of conditions, a policy rule to be applied to the data packet flow is generated. Policy controller 100 is configured to generate policy rules based on a third party or company profile, with the third party company being able to influence which policy rule should be selected by the policy controller. The authorization request may be received directly from an application function, AF 200. An input unit 230 is provided via which (Continued)

the third party can define and agree upon the service level agreement with an operator of the communications network. A policy control enforcing function PCEF 51 can interact with the PCRF 100 in order to enforce the policy rules.

21 Claims, 5 Drawing Sheets

(52) U.S. Cl.
CPC .......... H04L 47/20 (2013.01); H04L 63/0892 (2013.01); H04L 63/20 (2013.01); H04L 41/5022 (2013.01); H04L 67/20 (2013.01)

(56) References Cited

OTHER PUBLICATIONS

3GPP TS 23.203 v12.7.0; Technical Specification; 3rd Generation Partnership Project; Technical Specification Group Services and System Aspects; Policy and charging control architecture (Release 12)—Dec. 2014.

3GPP TS 29.201 v12.1.0; Technical Specification; 3rd Generation Partnership Project; Technical Specification group Core Network and Terminals; Representational state transfer (REST) reference point between Application Function (AF) and Protocol Converter (PC) (Release 12)—Dec. 2014.

PCT International Search Report for International application No. PCT/EP2015/051509—dated Oct. 6, 2015.

PCT Written Opinion of the International Searching Authority for International application No. PCT/EP2015/051509—dated Oct. 6, 2015.

\* cited by examiner

DYNAMIC POLICY RULE SELECTION

PRIORITY

This nonprovisional application is a U.S. National Stage Filing under 35 U.S.C. § 371 of International Patent Application Serial No. PCT/EP2015/051509 filed Jan. 26, 2015, and entitled "Dynamic Policy Rule Selection."

TECHNICAL FIELD

The present invention relates to a policy controller configured to generate policy rules for the packet flows in a communications network and to a corresponding method for generating policy rules.

BACKGROUND

Figure 1:
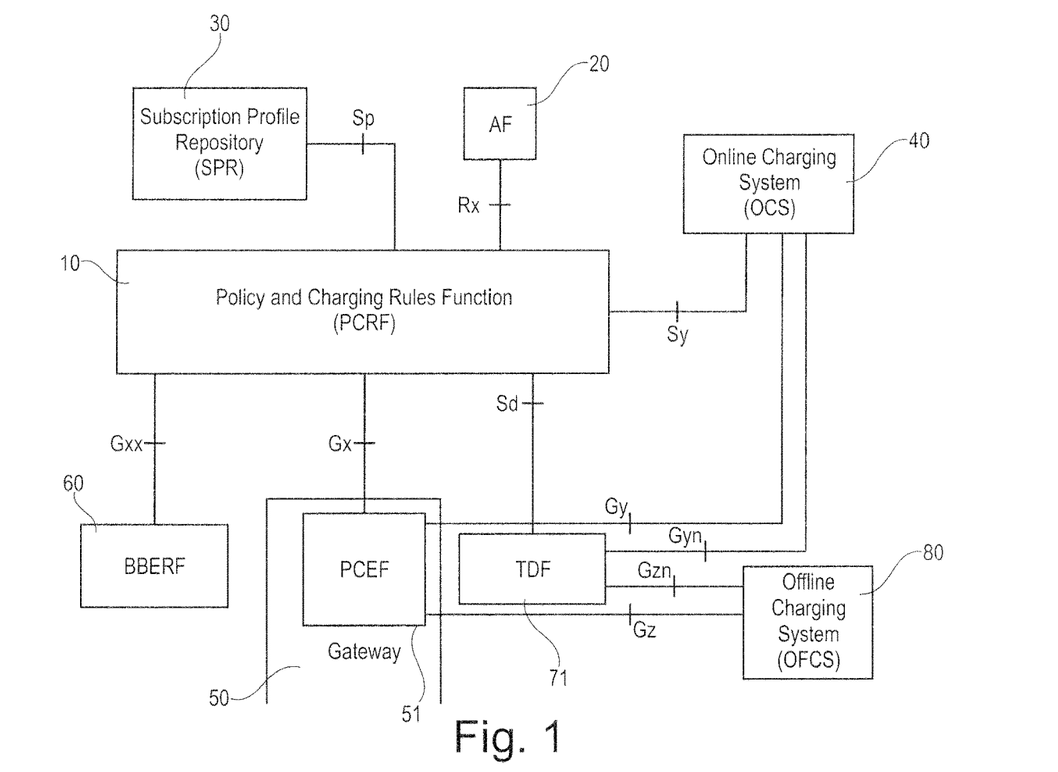
FIG. 1 shows an architectural overview over the existing policy and charging control mechanism.

The architecture that leverages policy charging control mechanisms is defined by a 3GPP (Third Generation Partnership Project) TS 23.203 (v.12.3.0) which is depicted in FIG. 1.

A Policy and Charging Rules Function (PCRF) 10 is the functional element that encompasses policy control decision and flow based charging control functionalities. It provides network and gating control, and manages the flow based charging. Via the Diameter Gx interface, using Policy and Charging Control (PCC) rules, the PCRF 10 instructs a Policy and Charging Enforcement Function (PCEF) 51 provided in a gateway 50 regarding the treatment of each service data flow.

Over its basic functionalities described in the last paragraph, the PCRF can receive session and media related information from an Application Function (AF) 20.

The AF 20 is an element offering applications the control of IP bearer resources and is able in that way to require differentiation of Quality of Service (QoS) for such applications. This entity shall communicate with the PCRF 10 to transfer session information (i.e. service information with description of the media to be delivered in the transport layer). This communication is performed using the Diameter $R_x$ interface.

Figure 2:
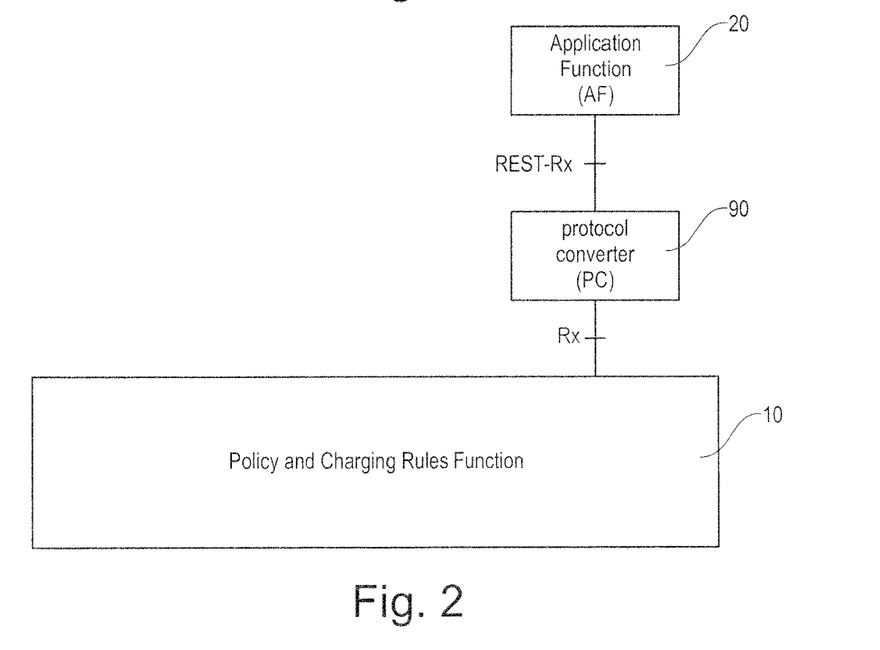
FIG. 2 shows in more detail the view of the interface between a policy and charging rules function and an application function shown in FIG. 1 with the use of a protocol converter.

The AFs 20 may be deployed by the operator of the communication network or, more precisely, by the operator offering the IP connectivity access network (IP-CAN), as presented at FIG. 1, or may be provided by an external third party service provider, as presented at FIG. 2 and further discussed.

The operator of the communication network may further be referred to as a communication network operator or, for the sake of simplicity, as a network operator, and both terms may indistinctly be used in the following unless otherwise specified.

The policy and charging information is determined based on the subscriber requesting the flow wherein the subscriber information of the corresponding rules are retrieved from a Subscription Profile Repository (SPR) 30. The PCRF 10 is furthermore connected to a Bearer Binding and Event Reporting Function (BBERF) 60 and an Online Charging System (OCS) 40. A traffic detection function 71 is provided to detect traffic and furthermore an Offline Charging System (OFCS) 80 is provided.

To accommodate another case, 3GPP TS 29.201 v12.1.0 also provides an XML-based interface between the AF 20 and the PCRF 10, as shown in FIG. 2. This another case fits the scenario commented above wherein the AF is provided by an external third party service provider. The Representational State Transfer (REST) reference point resides between the AF 20 and a Protocol Converter (PC) 90. In particular, the REST-Rx term is used to indicate the Rx interface based on REST between the AF and the PC. The PC 90 converts application level information received from the AF to diameter session information and communicates with the PCRF 10 via the diameter based on the Rx reference point. The Policy and Charging Control (PCC) architecture, the PCRF and the AF are described in further detail in 3GPP TS 23.203 and the diameter Rx reference point is described in 3GPP TS 29.214 v12.6.0.

For the sake of clarity, the terms 'third party entity' and 'partner entity' represent an AF provided by an external company or operator, other than the operator of the communications network, and they may indistinctly be used in the following unless otherwise specified.

Likewise, the terms 'external third party service provider', 'third party', 'third party enterprise' and 'partner' represent an external company or operator, other than the operator of the communications network, and they all may indistinctly be used in the following unless otherwise specified.

One of the services is the dynamic rule provisioning in real-time, which allows a customer of the network to partner with third parties, such as over the top (OTT) service providers and enterprises, for a particular treatment of a data packet flow. The dynamic rule provisioning service requires that an offline agreement or communication takes place between the network operator and its partner, where the partner indicates:

Identifier(s) of the application(s) running the partner service(s), together with type of media, bandwidth, IP address and port numbers. This is the 3GPP TS 29.214 calls 'service information'.

Different treatment for the same service per user or group of users so that different QoS and Charging values are assigned, for different groups of users. This feature is optional. This is what the 3GPP TS 29.214 addresses when it states that the PCRF may use the subscription information as basis for the policy and charging control decisions.

This offline agreement is configured in the PCRF 10 in terms of internal policies, static information and subscriber provisioning, which is used later on during the dynamic rule provisioning service execution in real time (i.e., when processing an authorization request received at the PCRF from the AF via the Rx interface).

The above situation is explained with the following example.

The company XYZ, in order to request a particular and differentiated bandwidth, priority or charging for the Corporate Lync Messaging, it needs to agree with the operator of the communications network the Application Function Identifier (AFId) "XYZA" that will identify the company, and the media types their services will use.

For service differentiation, the company XYZ indicates the users it has, which QoS (Quality of Service) and Charging value sets it is going to require, and which set of values apply to each subscriber.

It is assumed that the company XYZ might want all their employees to be charged according to the company rates in business hours for the Corporate Lync Messaging, except those assigned to specific critical projects, which would not have time restrictions. The operator needs to provision different conditions and policies for employees working in standard projects and for employees working in critical projects.

If e.g. security personnel and critical projects have higher priority and higher bandwidth for Corporate Lync Service, the operator has to provision beforehand the QoS policies to apply to the Corporate Lync Service for the company XYZ security personnel and the people assigned to the critical project.

The existing PCC architecture presented in the Technical Background chapter has proved to be effective so far, covering the major use cases required nowadays by the market. But the market is changing, and services evolution is denouncing important limitations, coming along with complex use cases that are no longer fully covered by the standardized PCC architecture.

Coming back to the previous example of the XYZ company, in the case that one employee assigned to a critical project is re-assigned to a new regular project, with the current procedures there is the need for the XYZ company to request the network operator to modify the conditions and policies for this particular employee.

Accordingly, a need exists to increase the flexibility when a policy rule is selected for a data packet flow.

SUMMARY

This need is met by the features of the independent claims. Further aspects are described in the dependent claims.

According to a first aspect, a method, by a policy controller, is provided for generating policy rules for data packet flows in a communications network, the policy controller having access to a policy database storing a service level agreement. The service level agreement contains a plurality of different service level identifiers, each service level identifier being associated with a set of conditions that govern the policy rules to be applied to the data packet flows in the communications network. According to one step of the method, an authorization request is received for a data packet flow, the authorization request comprising service information for a service and a service level identifier. The policy database is accessed and the set of conditions associated with the received service level identifier is determined. Based on the determined set of conditions a policy rule to be applied to the data packet flow is generated.

With the proposed method a solution is provided that relaxes the offline agreement between a network operator and a partner to indicate beforehand the end-user differentiation the partner requires for the treatment of the data packet flow. With the described method the partner requesting authorization of the data packet flow can indicate, based on the service level indicator, in real-time the part of the service level agreement that applies for this specific request. As the set of conditions can depend on the received service level identifier, the partner can, based on a selection of a corresponding service level identifier, adapt a policy rule more easily for the data packet flow. The service information for a service also contained in the authorization request contains the information received in the request and used by the policy controller to identify a specific service data flow. The service or session information contains the description of the media to be delivered in a data packet flow, e.g. in the transport layer.

Furthermore, a policy controller is provided configured to generate policy rules for data packet flows in the communications network, the policy controller comprising a policy database storing a service level agreement, the service level agreement containing a plurality of different service level identifiers, each service level identifier being associated with a set of conditions that govern the policy rules to be applied to the data packet flows in the communications network. The policy controller comprises a receiver configured to receive an authorization request for the data packet flow which contains service information for a service and a service level identifier. Furthermore at least one processing unit is provided configured to access the policy database and to determine a set of conditions associated with the received service level identifier. The at least one processing unit is furthermore configured to generate, based on the determined set of conditions, a policy rule to be applied to the data packet flow.

The service level agreement stored in the database may furthermore comprise a plurality of allowable service level data, wherein each allowable service level data includes a set of further conditions that govern the policy rules to be applied to the data packet flows, wherein each set of further conditions is used to modify any set of conditions associated with any service level identifier.

With the plurality of allowable service level data, it is furthermore possible to differentiate between different policy rules even when the service level identifier is the same.

By way of example, the authorization request for the data packet flow can comprise a service level data, wherein the method comprises determining that the received service level data corresponds to one amongst the plurality of allowable service level data for the service level agreement stored in the database, wherein generating the policy rule to be applied to the data packet flow is based on the set of conditions associated with the received service level identifier and the set of further conditions included in the received service level data.

By including the service level data in the authorization request, the partner requesting authorization of the data packet flow can control in further detail which conditions govern the policy rule, i.e. which policy rule is to be applied for the data packet flow for which the authorization request is received.

BRIEF DESCRIPTION OF THE DRAWINGS

The invention will be described in further detail below with reference to the accompanying drawings.

DETAILED DESCRIPTION OF EMBODIMENTS

With the present invention a solution is provided for a third party entity of third parties such as enterprises, over the top companies etc. to interact with a policy control domain of a communication network operator This interaction serves as request from the third party entity for user differentiation in a dynamic way of working, giving some control to the third party entity. With the implementation of the invention described above and further below, an operator of the communication network has the possibility to provide new and complex use cases that depend on the dynamic modification of a subscriber profile characteristic on the fly. With the invention, the communication network operator is allowing some control of the subscriber profiles management to third party enterprises, hiding the complexity of those actions, e.g. the complexity around the creation and submission of a PCC rule.

Following the example introduced in the background section, the invention will release company XYZ to notify offline to the network operators the different treatment that different employees need, e.g. for the corporate Lync Messaging service. The employees in XYZ can change assignments, which imply different corporate Lync Messaging service treatment, without the need of communicating so to a network operator. The network operator is released from manual provision tasks which are costly and prone to human errors.

There are scenarios when a network operator may agree beforehand with his third party enterprise for the latter to have a certain level of control over the subscription and thus over the policy rule to apply for data packet flows of its users or collaborators. This is especially used within scenarios where the third party enterprise is constantly changing the profile of its users, giving and modifying access characteristics to certain services, e.g. voice, data, access to internet etc. In those situations, an offline agreement between a third party enterprise and the network operator may not be flexible enough for the third party enterprise's needs.

To overcome this problem, a third party enterprise agrees with the network operator on a service level agreement which is stored in a policy database 130 of the network operator to which a policy controller 100 has access. The service level agreement stored in the policy database 130 contains a plurality of different service level identifiers, each service level identifier is associated with a set of conditions that govern the policy rules to be applied to the data packet flows in the communications network.

In an embodiment, a third party entity requesting authorization of the data packet flow can send service level agreement information which may comprise a service level identifier which is associated in the policy database 130 with a set of conditions that govern policy rules. A policy controller 100, e.g. a PCRF entity, receiving this authorization request for the data packet flow, including said service level identifier, accesses the policy database 130 and determines the set of conditions associated with the received service level identifier, and generates, based on the determined set of conditions, a policy rule to be applied to the data packet flow.

The policy controller 100 can have a configured relationship between the service level identifier and a Quality Of Service (QoS) and charging information that applies for the service level identifier.

In an embodiment, the service level agreement information stored in the database 130 may furthermore comprises a plurality of allowable service level data, wherein each allowable service level data includes a set of further conditions that govern the policy rules to be applied to the data packet flows, and wherein each set of further conditions is used to modify any set of conditions associated with any service level identifier. In this embodiment, the authorization request for the data packet flow may comprise a service level data. In this case, the policy controller determines that the received service level data corresponds to one amongst the plurality of allowable service level data for the service level agreement stored in the database, and generates the policy rule to be applied to the data packet flow, generation based on the set of conditions associated with the received service level identifier and the set of further conditions included in the received service level data.

For conveying the service level agreement information, one possibility is to include a new grouped Attribute Value Pair, AVP, service level definition in an authentication and authorization request (AAR) command transmitted from the third party entity to the policy controller 100 via the Rx interface.

The Service-Level-Definition AVP can comprise two new AVPs:
  a Service-Level-Identifier AVP (UTF8String), an AVP that includes an identifier of a service level to be applied, e.g. "XYZ LyncUsers".
  Service-level-Data AVP (OctetString) contains information that defines particular characteristics of the service level. There might be multiple instances of the Service-level-Data AVP.

The information provided in the service level definition AVP allows the PCRF to derive a policy and charging information that applies to the services that are being described by the media component description AVPs.

The third party entity may not be able to provide exhaustive information to the PCRF as it is too complex information for the third party entity to be aware of. Also, the operator needs to assure that Quality of Service (QoS) and charging parameters that are assigned to services are aligned and coherent with the daily needs (for example the operator needs to assure that QCI (QoS Class Indicator) to be applied to emergency services is prioritized when compared with video or gaming services).

So, in order to combine flexibility and simplicity towards a third party enterprise or partner with control from the network operator, sets of conditions, which include the possible set of actions, conditions and policies that a third-party enterprise can indicate on real time, can be agreed beforehand by means of a service level agreement, and configured in the network operator policy controller, e.g. PCRF. With this approach, the third party enterprise has an agreed level of control to the policy and charging to be applied, being able to freely combine the agreed set of actions, conditions and policies among the different services and users.

The Service-Level-Identifier AVP identifies a particular set of conditions, which may include the configured set of actions, conditions and policies to be applied for the requested dynamic service. The PCRF can have a configured relationship between the Service-Level-Identifier and the QoS and Charging that apply for that Service-Level-Identifier and the requested Dynamic Service.

The Service-Level-Data AVP is optional. It is provided to enhance or modify the set of conditions associated to a Service-Level-Identifier AVP with a set of further conditions, which may include further actions, conditions and policies. For example, the Service-Level-Data "Charging001" refers to the configured action in the PCRF "The charging in business hours (8:00-18:00) is according to rate 1", and Service-Level-Data "QoS023" refers to the configured action "QoS corresponding to internet traffic".

The Service-Level-Data AVP may also contain information (metadata language known by the policy controller) that specifies further conditions to be taken into account by the PCRF to make policy decisions and to generate policy rules. For example, the Service-Level-Data "Access:WiFi" indicates to the PCRF that the set of conditions associated with the Service-Level-Identifier AVP must be applied only when the subscriber initiates the service over a Wi-Fi access network.

The service level definition AVP is defined in the Rx reference point as follows:
Service-Level-Definition::=<AVP Header: tbd>
{Service-Level-Identifier}
*[Service-Level-Data]

In the REST Rx reference point using a protocol converter 90 as shown in FIG. 2, the Service-Level-Definition AVP is mapped onto the ServiceLevelDef XML group, defined as follows:

```
<xs:group name="ServiceLevelDef">
  <xs:sequence>
    <xs:element ref="ServiceLevelId" />
    <xs:element minOccurs="0" maxOccurs="unbounded"
    ref="ServiceLevelData" />
  </xs:sequence>
</xs:group>
```

According to the Diameter protocol and to the AAR command definition, there may be multiple Media-Component-Description in an AAR command. Each Media-Component-Description representing a service and its characteristics. Where the new Service-Level-Definition AVP is applicable only to certain services, a particular Service-Level-Definition AVP may be added inside each corresponding Media-Component-Description. However, where a common Service-Level-Definition AVP is applicable to all the services, i.e. to every Media-Component-Description, then this common Service-Level-Definition AVP may be added at the AAR command level. In cases where a Media-Component-Description includes a particular AVP and the AAR command includes a common AVP, in an embodiment the common AVP at AAR command level is the one that takes precedence, whereas in another embodiment the particular AVP at media component level is the one that takes precedence.

With the proposed AVPs, the Media-Component-Description AVP is modified in accordance with an embodiment of the invention as follows, wherein the new AVPs are underlined:
Media-Component-Description::=<AVP Header: 517>
{Media-Component-Number}
*[Media-Sub-Component]
[AF-Application-Identifier]
[Media-Type]
[Max-Requested-Bandwidth-UL]
[Max-Requested-Bandwidth-DL]
[Min-Requested-Bandwidth-UL]
[Min-Requested-Bandwidth-DL]
[Flow-Status]
[Reservation-Priority]
[RS-Bandwidth]
[RR-Bandwidth]
*[Codec-Data]
[Service-Level-Definition]

The authorization and authentication request (AAR) command at the Rx interface is modified in accordance with an embodiment of the invention as follows, wherein again the new AVPs are underlined:
<AA-Request>::=<Diameter Header: 265, REQ, PXY>
<Session-Id>
{Auth-Application-Id}
{Origin-Host}
{Origin-Realm}
{Destination-Realm}
[Destination-Host]
[IP-Domain-Id]
[AF-Application-Identifier]
[Service-Level-Definition]
*[Media-Component-Description]
[Service-Info-Status]
[AF-Charging-Identifier]
[SIP-Forking-Indication]
*[Specific-Action]
*[Subscription-Id]
*[Supported-Features]
[Reservation-Priority]
[Framed-IP-Address]
[Framed-Ipv6-Prefix]
[Called-Station-Id]
[Service-URN]
[Sponsored-Connectivity-Data]
[MPS-Identifier]
[Rx-Request-Type]
*[Required-Access-Info]
[Origin-State-Id]
*[Proxy-Info]
*[Route-Record]
*[AVP]

The service level agreement stored in the policy database 130 and comprising the plurality of allowable service level data is optional. In case the service level data is not present in the received authorization request, the PCRF considers that there are no further conditions to modify the conditions associated with the service level identifier. It is also possible to use equivalent xml definitions in the REST Rx reference point.

For this solution to work, the PCRF has access to the service level agreement, meaning that it knows beforehand how to map the received service level identifier into a corresponding Quality of Service, QoS, and charging characteristics.

Figure 4:
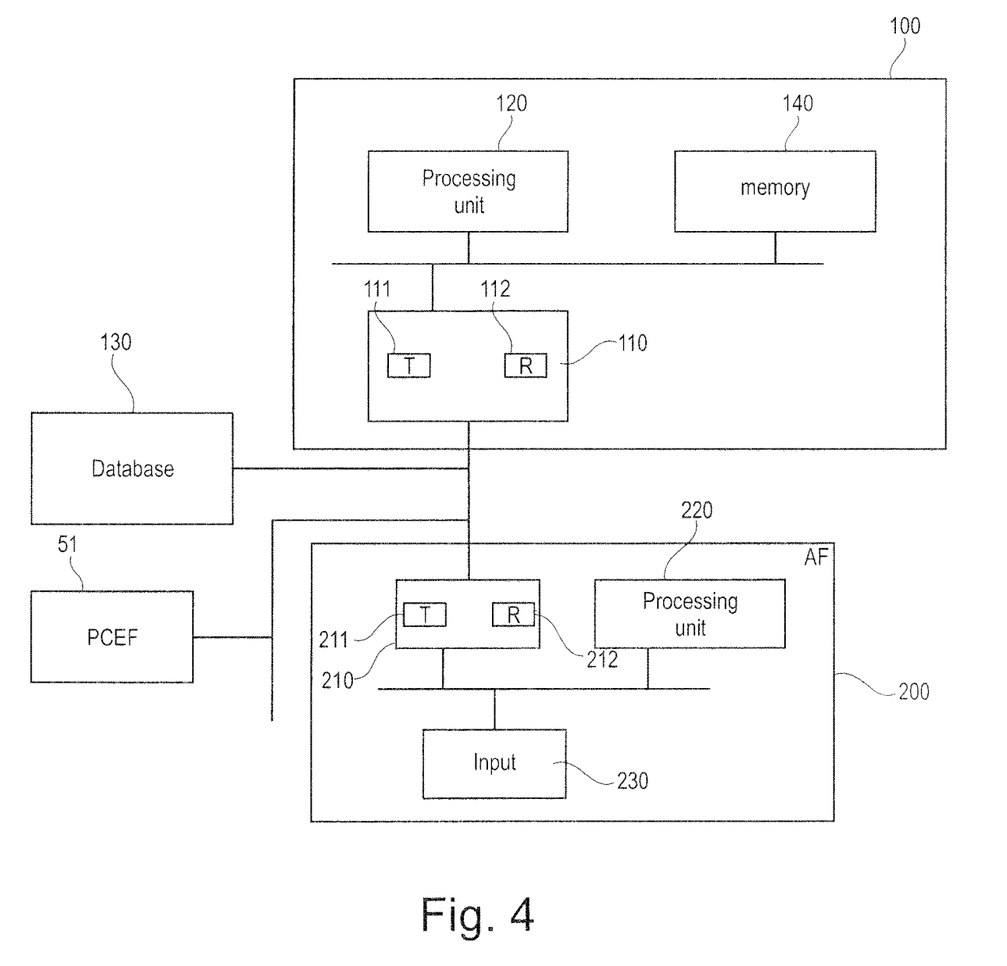
FIG. 4 shows a schematic view of a policy controller used to generate a policy rule as shown in FIG. 3.

FIG. 4 shows a schematic representation for policy controller 100 which is configured to generate policy rules based on a third party or company profile, with the third party company being able to influence which policy rule should be selected by the policy controller. The policy controller 100 comprises an input/output unit 110 comprising a transmitter 111 and a receiver 112. The input/output unit 110 represents the possibility of the policy controller to communicate with other entities inside or outside a communications network and the input/output unit may be configured to work in accordance with any of the interfaces shown in FIG. 1. The input/output unit 110 provides the possibility to communicate with other nodes or entities of the communications network, the transmitter 111 providing the possibility to transmit control messages or user data to other nodes or entities, the receiver 112 providing the possibility to receive control messages or user data from other nodes or entities. The receiver 112 is configured to receive an authorization request for a data packet flow which comprises service information for a service and a service level identifier. Service can be described as internet or communication service that is delivered over-the-top of the operator's communication network. Service information in this context is the service characteristics that are coming at the Media-Component-Description (e.g. Media-Type, requested bandwidth, etc.). The service information can use standardized parameters. In the present case service information could be defined as set of information conveyed from the AF to the PCRF over the Rx interface to be used as a basis for PCC decisions at the PCRF, including information about the AF session (e.g. application identifier, type of media, bandwidth, IP address and port number).

The policy controller comprises at least one processing unit 120 which comprises one or more processors and which is responsible for operation of the policy controller 100. The processing unit 120 can generate the commands that are needed to carry out procedures of the policy controller discussed above or discussed in further detail below in which the policy controller is involved. A memory 140 such as a read only memory, a flash memory, a random access memory, a mass storage or the like can store a suitable program code to be executed by the processing unit 120 so as to implement the needed functionalities of the policy controller 100.

The policy controller furthermore has access to a database 130, which in the embodiment shown in FIG. 4 is indicated to be outside the policy controller. The database 130 may also be incorporated into the policy controller 100, however, it only needs to be assured that the policy controller 100 can access the database which plays the role of a policy database and which stores the service level agreement which was agreed upon with a third party. The service level agreement contains the plurality of different service level identifiers, wherein each of the several service level identifiers is associated with a set of conditions that govern the policy rules to be applied to the data packet flows in the communications network. The communications network may be a mobile communication network or any other network where, on a subscriber base, data packet flows can be exchanged between a user and e.g. a server.

The policy database 130 can now maintain a table where the different QoS and charging associations indexed by at least the service level identifier and optionally the service level data are stored. The policy controller 100 will analyse this table and its actions and can then generate the corresponding QoS and charging information for a dynamic policy and charging control rule to be installed.

Table 1 disclosed below shows by way of example a service level agreement that company XYZ_A has agreed with the network operator (for the corporate Lync Messaging services and Internet services) and that are configured in the policy controller 100, i.e. in the policy database 130. The policy controller relates the received service level identifier with the associated set of conditions, i.e. service characteristics.

TABLE 1

Conditions subscribed by XYZ_A

| Service-Level-Identifier | Service Description |
| --- | --- |
| XYZ_AServiceLevel001 | Users will be charged rate 1 during business hours, and will enjoy a QoS for Internet services with medium QoS. Out of business hours users will be charged with rate 2 and will enjoy a QoS for Internet services with medium QoS and low priority Corporate Lync Messaging Service (video) is prioritized over internet traffic and delivered with medium QoS. Rate 1 always apply |
| XYZ_AServiceLevel002 | Users will be charged with rate 1, and will enjoy QoS for streaming traffic and high ARP for video services Corporate Lync Messaging Services are prioritized over internet traffic and delivered with high QoS and high ARP |

Following this example, when a user of XYZ_A company, who does not belong to a critical project, i.e. belongs to a usual object identified by XYZ_A service level 0001, logs on, the user gets a service from the network during business hours corresponding to rate 1 and medium QoS for internet; and corresponding to rate 2 with medium QoS and low priority out of business hours. When this user uses the corporate Lync Messaging service (video) the traffic is prioritized over internet and is delivered with medium QoS at rate 1 regardless of the time of the day.

At log-on XYZ_A company sends an Rx request indicating at command level that the service level identifier is XYZ_A service level 0001. At corporate Lync Messaging service (video) use, the XYZ_A company sends an Rx request indicating at media component level (video service for corporate Lync Messaging service) the service level identifier is XYZ_A service level 0001.

However, other third parties or companies may require more flexibility than an agreed set of conditions, i.e. characteristics, associated with the service level identifier and may provide further conditions, i.e. additional characteristics, that modify the set of conditions, i.e. characteristics, previously associated with the service level identifier. This is useful where the set of characteristics associated with the service level identifier is more generally and frequently used and only in particular cases some different characteristics should apply. This high flexibility is obtained with the use of a plurality of allowable service level data which include the further conditions that indicate which policy rule should be applied to the data packet flow.

Moreover, where other third parties or companies may require more granularity on the characteristics to apply, there may be a default service level identifier (e.g. by XYZ_B_service_level_1111) associated with a set of conditions that simply indicates applying the characteristics, i.e. further conditions, associated with one or more of the service level data. In this case, the operator and the third party or company need to agree on the meaning of the service level data to be exchanged, so they are coherent with the operator configuration. This is the only offline information that both entities need to deal with in this embodiment.

Table 2 below shows an example of this allowable service data level and further conditions as subscribed by company XYZ_B:

TABLE 2

Further conditions subscribed by XYZ_B

| Service-Level-Data | Description |
| --- | --- |
| QoS0001 | QoS for internet traffic. Medium BW. Low priority out of business hours |
| QoS0002 | QoS for internet traffic. High BW |
| QoS0003 | QoS for streaming traffic. High BW. High priority |
| QoS0004 | High BW, High priority, Precedence over other types of traffic |
| QoS0005 | Medium BW, High priority |
| Chr0001 | Charging in business hours (8:00-18:00) is according to rate 1. Out of business hours is rate 2 |
| Chr0002 | Always rate 1 |
| Access:WiFi | Apply only for WiFi access |

Table 2 shows the allowable service level data and corresponding further conditions that company XYZ_B has agreed upon with the network operator and that are configured in the policy database 130. The policy controller 100 on run time verifies that the received service level data, with the further conditions included therein, correspond to any one of the allowable service level data and corresponding further conditions configured in the policy database. Each of the further conditions shown in table 2 and each of the service level data represents a certain QoS and/or charging characteristic.

As in the previous example, when a user of XYZ_B company, who does not belong to a critical project and is so far not assigned to another usual project, i.e. belongs to a default project identified e.g. by XYZ_B_service_level_1111, logs on, said user can get a service from the network during business hours corresponding to rate 1 and medium QoS for internet; and corresponding to rate 2 with medium QoS and low priority out of business hours. When the user uses the corporate Lync Messaging services (video), this video traffic is prioritized over Internet and is delivered with medium QoS at rate 1 regardless of the time of day. At the user logon, XYZ_B company sends Rx requests, indicating at a command level that the service level identifier is XYZ_B_service_level_1111 and the following set of Service-Level-Data AVPs with values QoS0001 and Chr0001. At corporate Lync Messaging service (video) usage, the XYZ_B company sends an Rx request indicating at media component level (video service for corporate Lync Messaging service), the service level identifier is XYZ_B_service level_1111 and Service-Level-Data AVPs with values QoS0005 and Chr0002.

Referring back to FIG. 4 the authorization request may be received directly from an application function, AF 200, which comprises an input/output unit 210 including a transmitter 211 and a receiver 212. As discussed above in connection with PCRF 100, the input/output unit symbolizes the possibility to transmit and to receive user data or control messages, a processing unit 220 being provided to generate the commands that are needed to carry out procedures where the application function 200 is involved. An input unit 230 can be provided via which the third party can define and agree upon the service level agreement with an operator of the communications network.

A policy control enforcing function PCEF 51 can interact with the PCRF 100 in order to enforce the policy rules as discussed above in connection with FIG. 1.

Figure 3:
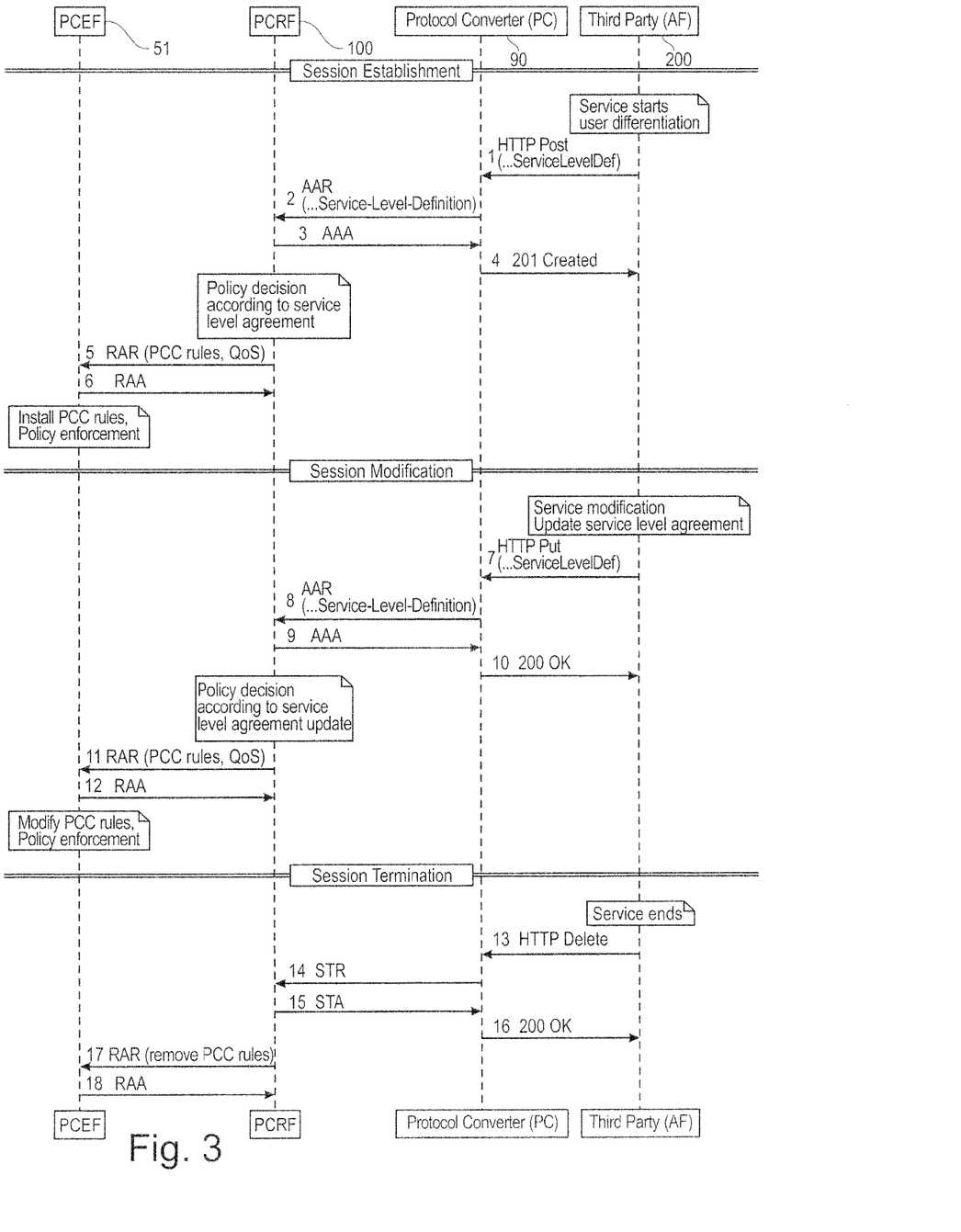
FIG. 3 shows a signaling flow illustrating how the selection of a policy rule can be achieved in a more flexible way.

FIG. 3 summarizes an exemplary message exchange showing the increased flexibility when assigning a policy rule for a data packet flow.

As shown in step 1 of FIG. 3, a third party entity, the application function 200, receives an internal or external trigger to set up a new service, by sending the HTTP POST to the protocol converter 90. The application function 200 may correspond to the application function 20 shown in FIG. 1 and, more precisely, to the application function shown in FIG. 2 that represents the external network element which controls the multimedia application. In the second step, the protocol converter 90 converts the request to a diameter authorization and authentication request command (AAR) for a new Rx diameter session. The AAR command includes the service level definition AVP or, at least, the service level identifier AVP.

In step 3, the PCRF 100 authorizes the session information and sends a diameter AAA command (authorization, authentication and accounting) to the protocol converter 90.

In step 4, the protocol converter, PC, 90 converts the required content of the Diameter AAA command and provides it in the HTTP 201 CREATED response to the AF 200.

In step 5, the PCRF 100 derives the PCC rules to be installed, the QoS information and charging characteristics, according to the service level agreement information, i.e. at least a service level identifier, provided by the AF 200. More specifically, the PCRF derives the PCC rules based on the set of conditions associated with the received service level identifier. The PCRF 100 sends a diameter RAR (re-authorization request) command to the PCEF 51.

In step 6, the PCEF 51 installs the PCC rules to enforce the policy decision and sends a diameter RAA (radio authorization answer) command to the PCRF 100.

In step 7, if the third party entity needs to modify the service level agreement currently applied to a given dynamic service, it can do so by sending the HTTP PUT to the protocol converter 90 to initiate the AF session modification procedure, including the updated service level agreement definition.

In step 8, the PC 90 converts the AF session modification request to a Diameter AAR command and sends the Diameter AAR command to the PCRF 100. The AAR command includes the modified Service-Level-Definition AVP with a new Service-Level-Identifier AVP and/or one or more Service-Level-Data AVPs.

In step 9, the PCRF 100 updates and authorizes the session information and sends a Diameter AAA command to the PC 90.

In step 10, the PC 90 converts the required content of the Diameter AAA command and provides it in the HTTP 200 OK response to the AF 200.

In step 11, the PCRF 100 updates the provisioned PCC rules, QoS information and charging characteristics, according to the modified service level agreement information, i.e. the modified Service-Level-Definition AVP, provided by the AF 200. The PCRF 100 sends a Diameter RAR command to the PCEF 51.

In step 12, the PCEF 51 updates the PCC rules to enforce the new policy decision and sends a Diameter RAA command to the PCRF 100.

When the third party entity, i.e. the AF 200, receives an internal or external trigger for session release, in step 13, it can do so by sending the HTTP DELETE to the PC to initiate the AF session termination procedure.

In step 14, the PC 90 converts the AF session termination request to Diameter STR command.

In step 15, the PCRF 100 sends a Diameter STA command to the PC 90.

In step 16, the PC 90 converts the Diameter STA command and provides the HTTP 200 OK response to the AF 200.

In step 17, the PCRF 100 identifies the affected PCC rules to be removed and sends a Diameter RAR command to the PCEF 51.

Finally, in step 18, the PCEF 51 removes the PCC rules, updates the policy decision and sends a Diameter RAA command to the PCRF 100.

In the exemplary embodiment discussed above in connection with FIG. 3, the protocol converter 90 was present in the flowchart. However, especially where the scenario shown in FIG. 1 applies, it is also possible that the application function 200 directly communicates with the PCRF 100 via the diameter protocol.

Figure 5:
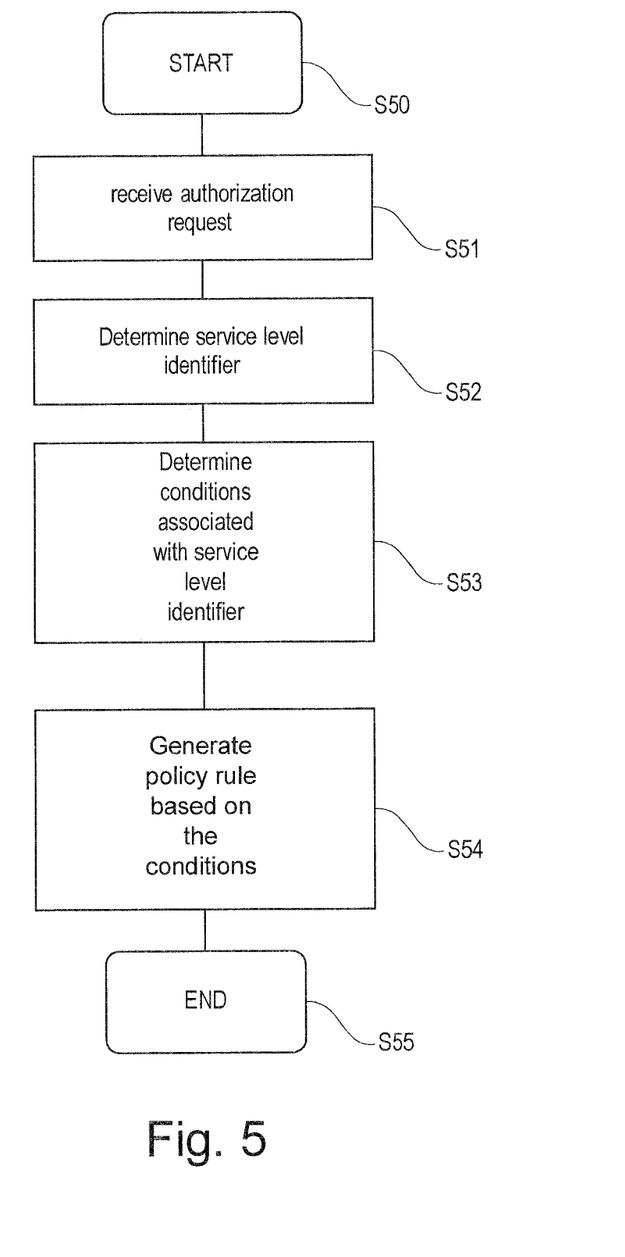
FIG. 5 shows a flowchart containing steps carried out by a policy controller of FIG. 4 to generate a policy rule.

FIG. 5 summarizes exemplary steps carried out by a policy controller or PCRF 100 in order to generate a policy rule. In step S50, the method starts and in step S51, the policy controller 100 receives the authorization request via the Rx interface either directly from the application function or from the protocol converter. In step S52, the policy controller 100 determines or identifies the service level identifier contained in the received authorization request.

The policy database 130 is accessed in step S53 and the set of conditions associated with the received service level identifier is determined. The policy rule is then generated in step S54, based on the determined set of conditions. The method ends in step S55. According to another step not shown, the generated policy rule may be transmitted to PCEF 51 where the policy rule can be enforced.

In the exemplary embodiment of FIG. 5, the service level identifier is used alone to determine and generate the policy rule.

Figure 6:
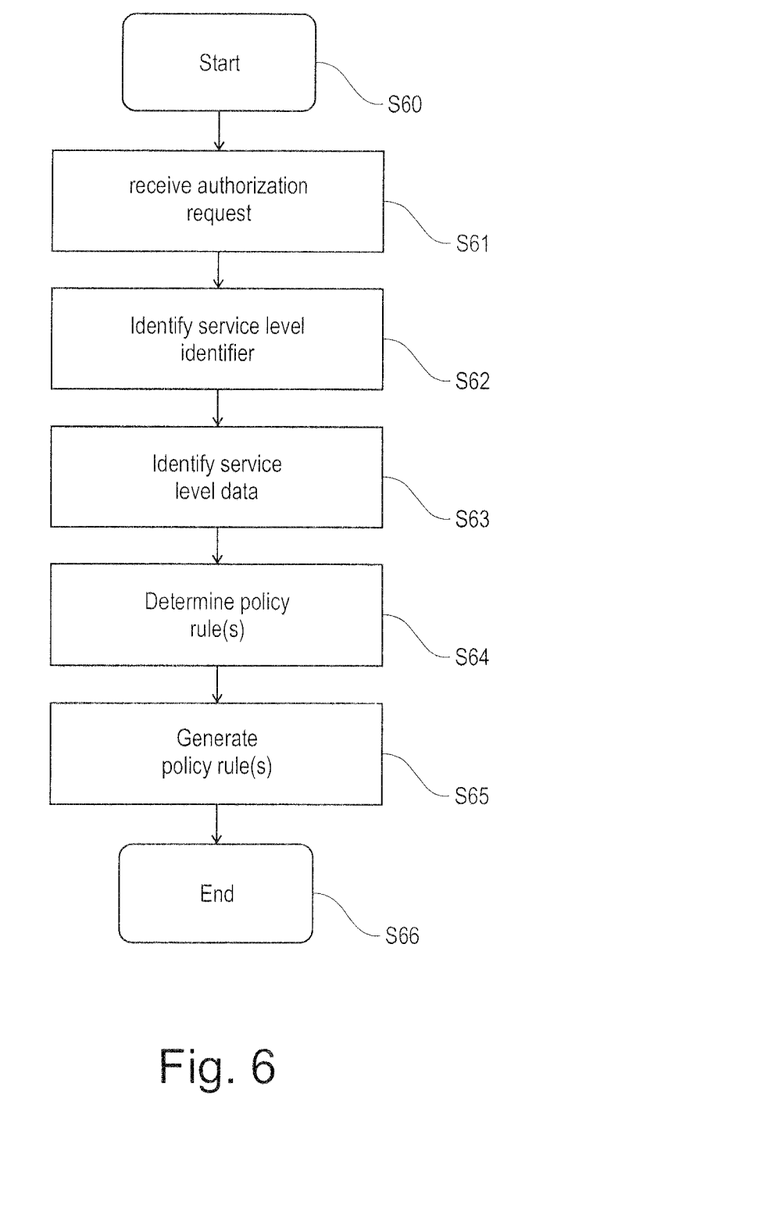
FIG. 6 shows a flowchart of another embodiment for generating a policy rule by the policy controller of FIG. 4.

In the exemplary embodiment of FIG. 6, in addition to the service level identifier, the service level data is used to more precisely determine the policy rule. The method starts in step S60 and in step S61, the authorization request is received, the authorization request containing a service level identifier and service level data. In step S62, the service level identifier is indentified or determined. Steps S61 and S62 can correspond to steps S51 and S52 discussed above in connection with FIG. 5. In addition to the identified service level identifier, the service level data is identified in step S63. The set of conditions associated with the service level identifier in the policy database 130 and the further conditions included in the service level data are determined in step S64, and the policy rule(s) is/are then generated, based on the set of conditions associated with the service level identifier and based on the further conditions included in the service level data, for the flow for which the request was received in step S61. The method ends in step S66.

Summarizing, the invention allows an operator of a communications network to agree with a third party enterprise a certain level of control over the subscription of its collaborators on real time, when the third-party enterprise services are being used.

From the above discussion some general rules and definitions can be deduced.

By way of example, a service level agreement stored in the database can comprise a plurality of allowable service level data wherein each allowable service level data includes a set of further conditions that govern the policy rules to be applied to the data packet flows. Each set of further conditions is used to modify any set of conditions associated with any service level identifier. When the authorization request for the data packet flow comprises a service level data, it is determined that the received service level data corresponds to one among the plurality of allowable service level data for the service level agreement stored in the database. The policy rule to be applied to the data packet flow is then generated based on the set of conditions associated with the received service level identifier and the set of further conditions included in the received service level data. As discussed above, the inclusion of the service level data provides an even higher flexibility for the determination and generation of the policy rule.

The generation of the policy rule can further include determining a QoS parameter to be applied to the data packet flow and a charging information usable for cost calculation of the data packet flow based on the received service level identifier. The QoS parameter and the charging information may be determined based on received service level identifier and the received service level data.

Thus, when the entity sending the authorization request changes one of the service level identifiers and the service level data, the QoS parameter and all the charging information can be adapted. The received authorization request may be a request for authenticating a user for which the data packet flow is requested and for authorizing the data packet flow. Thus, authorization request may be an AAR command as can be deduced from FIG. 3.

Furthermore, the generated policy rule may be sent to a policy enforcing entity of the communications network which enforces the policy rule for the data packet flow. The service level identifier contained in the authorization request may be present as an Attribute Value Pair, AVP, in the authorization request. Additionally, the received service level data contained in the authorization request may also be present an Attribute Value Pair in the authorization request.

Furthermore, the received authorization request can be generated by an application function entity and received by the policy controller via the Rx interface.

Furthermore, the service level agreement can be concluded by an operator of the communications network and a third party. The received authorization request is received from an application function entity of the third party.

The third party enterprise agrees with the network operator on the service level the third party enterprise may use for its collaborators. This agreement is stored in the policy database as service level agreement. Depending on the service level agreement, the third party enterprise can be entitled to different degrees of control for the service treatment for a specific user.

By implementing the above-described mechanisms, the operator of the communications network is opening the door to new and complex use cases that depend on the dynamic modification of a subscriber profile characteristics on the fly.

This is especially useful to the communications network operator's commercial offers to third party enterprises. This way, third party enterprises may outsource the telecommunications and IT environment to the communications network operators, allowing them to deliver the service to the employees or collaborators in a faster way. Moreover, with the above-described invention, the communications network operator is allowing some control of the subscriber profiles management to third party enterprises while hiding the complexity of those actions such as the complexity around the creation and submission of a PCC rule.

The invention claimed is:

1. A method, by a policy controller, for generating policy rules for data packet flows in a communications network, the policy controller having access to a policy database storing a service level agreement, the service level agreement containing a plurality of different service level identifiers and a plurality of allowable service level data, each service level identifier being associated with a set of conditions that govern the policy rules to be applied to the data packet flows in the communications network, and each allowable service data being associated with a set of further conditions that govern the policy rules to be applied to the data packet flows, the method comprising the steps of:

receiving an authorization request for a data packet flow, the authorization request comprising service information for a service, a service level identifier, and an allowable service level data, accessing the policy database and determining a set of conditions associated with the received service level identifier and a set of further conditions associated with the received allowable service level data, generating, based on the determined set of conditions, a policy rule to be applied to the data packet flow, and modifying, based on the determined set of further conditions, the generated policy rule.

2. The method according to claim 1, wherein the determined set of further conditions is used to modify any set of conditions associated with any service level identifier.

3. The method according to claim 2, wherein the authorization request for the data packet flow comprises a service level data, wherein the method comprises determining that the received service level data corresponds to one amongst the plurality of allowable service level data for the service level agreement stored in the database, and wherein generating the policy rule to be applied to the data packet flow, is based on the set of conditions associated with the received service level identifier and the set of further conditions included in the received service level data.

4. The method according to claim 3, wherein the received service level data contained in the authorization request is present as an Attribute Value Pair, AVP, in the authorization request.

5. The method according to claim 1, wherein generating the policy rule includes determining a quality of service parameter to be applied to the data packet flow and a charging information for cost calculation of the data packet flow based on the received service level identifier.

6. The method according to claim 5, wherein the quality of service parameter and the charging information are determined based on the received service level identifier and the received service level data.

7. The method according to claim 1, wherein the received authorization request is a request for authenticating a user for which the data packet flow is requested and for authorizing the data packet flow.

8. The method according to claim 1, comprising the step of transmitting the generated policy rule to a policy enforcing entity of the communications network which enforces the policy rule for the data packet flow.

9. The method according to claim 1 wherein the service level identifier contained in the authorization request is present as an Attribute Value Pair, AVP, in the authorization request.

10. The method according to claim 1, wherein the received authorization request is generated by an application function entity and received by the policy controller via an Rx interface.

11. The method according to claim 1, wherein the service level agreement is concluded by an operator of the communications network and a third party, and the received authorization request is received from an application function entity of the third party.

12. A policy controller configured to generate policy rules for data packet flows in a communications network, the policy controller comprising:
    a policy database storing a service level agreement, the service level agreement containing a plurality of different service level identifiers and a plurality of allowable service level data, each service level identifier being associated with a set of conditions that govern the policy rules to be applied to the data packet flows in the communications network, and each allowable service data being associated with a set of further conditions that govern the policy rules to be applied to the data packet flows,
    a receiver configured to receive an authorization request for a data packet flow, the authorization request containing service information for a service, a service level identifier, and an allowable service level data,
    at least one processing unit configured
        to access the policy database and to determine a set of conditions associated with the received service level identifier and a set of further conditions associated with the received allowable service level data,
        to generate, based on the determined set of conditions, a policy rule to be applied to the data packet flow, and
        to modify, based on the determined set of further conditions, the generated policy rule.

13. The policy controller according to claim 12, wherein the determined set of further conditions is used to modify any set of conditions associated with any service level identifier.

14. The policy controller according to claim 13, wherein the receiver is configured to receive the authorization request containing a service level data, and wherein the at least one processing unit is configured to determine that the received service level data corresponds to one amongst the plurality of allowable service level data for the service level agreement stored in the database, and to generate the policy rule based on the set of conditions associated with the received service level identifier and the set of further conditions included in the received service level data.

15. The policy controller according to claim 14, wherein the received service level data contained in the authorization request is present as an Attribute Value Pair, AVP, in the authorization request.

16. The policy controller according to claim 12, further comprising a transmitter configured to transmit the generated policy rule to a policy enforcing entity configured to enforce the policy rule for the data packet flow in the communications network.

17. The policy controller according to claim 12, wherein the receiver is configured to receive the authorization request via an Rx interface.

18. The policy controller according to claim 12, wherein the at least one processing unit is configured to generate, in generating the policy rule, a quality of service parameter to be applied to the data packet flow and a charging information for cost calculation of the data packet flow based on the received service level identifier.

19. The policy controller according to claim 18, wherein the at least one processing unit is configured to generate the quality of service parameter and the charging information based on the received service level identifier and the received service level data.

20. The policy controller according to claim 12, further being configured to operate as a policy and charging rules function of the communications network.

21. The policy controller according to claim 12, wherein the service level identifier contained in the authorization request is present as an Attribute Value Pair, AVP, in the authorization request.

* * * * *